United States Patent [19]

Hedges

[11] 4,242,625

[45] Dec. 30, 1980

[54] ENERGY ECONOMIZER FOR POLYPHASE INDUCTION MOTORS

[75] Inventor: Rhey W. Hedges, Ft. Lauderdale, Fla.

[73] Assignee: Louis W. Parker, Fort Lauderdale, Fla.

[21] Appl. No.: 35,974

[22] Filed: May 4, 1979

[51] Int. Cl.³ .............................................. H02P 7/36
[52] U.S. Cl. .................................. 318/729; 318/800; 318/812
[58] Field of Search ............... 318/729, 799, 800, 809, 318/812

[56] References Cited

U.S. PATENT DOCUMENTS

| | | | |
|---|---|---|---|
| 3,470,436 | 9/1969 | Steele | 318/799 |
| 4,052,648 | 10/1977 | Nola | 318/812 |
| 4,176,307 | 11/1979 | Parker | 318/798 |
| 4,190,793 | 2/1980 | Parker et al. | 318/800 |

*Primary Examiner*—Gene Z. Rubinson

*Attorney, Agent, or Firm*—Pollock, Vande Sande and Priddy

[57] ABSTRACT

A standard three phase induction motor starts with all three of its input connections connected to the three phase power line. Two of these connections are through triacs which remain continously conducting below said motor's particular most energy-efficient speed, which is above about 95% of synchronous speed. This assures full starting torque and undiminished overload handling capability. The triacs, in response to a control signal, may open the circuits over a sufficiently wide portion of the sine wave input voltage to substantially maintain said particular efficient speed under all rated load conditions. To assure smooth operation and maximum energy savings, the two triacs conduct differently at very light motor loads. The DC control voltage which determines the operation of the triacs is generated by a frequency discriminator circuit which receives its information from a load detecting device that is frequency modulated by load/speed related properties inherent to induction motors.

20 Claims, 2 Drawing Figures

ENERGY ECONOMIZER FOR POLYPHASE INDUCTION MOTORS

CROSS-REFERENCE TO RELATED APPLICATIONS

Parker and Hedges prior copending U.S. Application Ser. No. 917,698, filed June 21, 1978, now U.S. Pat. No. 4,190,793 for Energy Economizer for Induction Motors, which is a continuation-in-part of U.S. Application Ser. No. 839,945, filed Oct. 6, 1977, now abandoned, discloses various structural and operational aspects of the present invention as employed, however, in a single phase motor system, and the disclosure of said prior copending Application Ser. No. 917,698, U.S. Pat. No. 4,190,793 is incorporated herein by reference.

BACKGROUND OF THE INVENTION

Conventional induction motors maintain the full sine wave of voltage across the stator winding regardless of the load in the motor. In those cases where the load varies within wide limits e.g., when the motor is used for hoisting operations, most of the time the motor is not expanding its full rated load. In such cases, the iron losses in the stator are substantially the same when the motor is operating below full rated load as is the case when the motor is operating at full rated load; and, due to low power factor in such cases, the stator current is high and the copper losses are also substantial.

When a conventional polyphase induction motor is operating below its full rated load, a fraction of the sine wave of voltage or operation on a single phase would satisfy the actual load requirement imposed on the motor. Such cutting in part in the sine wave voltage or operating on a single phase would result in considerably less iron and copper losses and less heating of the stator. The resultant lower operating temperature further reduces the copper losses in the motor due to lowered ohmic resistance. These factors combine to effect a significant reduction in the energy which is consumed by the motor, with a consequent conservation in available energy sources and a reduction in operating costs.

The present invention is based upon a recognition of the foregoing factors, and provides a simple yet reliable mechanism operative to cause the electrical energy supplied to the stator and the stator flux density of a standard-unmodified-AC polyphase induction motor to become a function of its load demand at any given moment. The invention accomplishes this by permitting a greater or smaller portion of the sine wave of voltage from a power source to enter the stator as a function of the percentage of slip of the motor or by operating on a single phase. In other words, the sine wave of the voltage supplied to the motor's stator is modified to suit existing load conditions. This results in the reduction of iron and copper losses.

SUMMARY OF THE INVENTION

In accordance with the present invention, a standard three phase motor has only one input to its stator connected directly to the three phase AC power source. The other two stator inputs are coupled to said power line through triacs which begin conduction continuously when input power is first applied to assure undiminished torque during motor start-up. After motor start-up, said triacs become part of a conditionally operative nonlinear positive feedback loop and may be phase angle controlled by wave modifier means responsive to a frequency modulation signal generated by motor load detecting means, with the result that each triac conducts all or a fraction of its sine wave power input in accordance with the actual load demand placed on the motor. In this way, motor speed is kept at a substantially constant particular speed under all load conditions within the rating of the motor, and full power is supplied at greater loads which assures undiminished overload performance.

In order to achieve optimum efficiency and smooth operation, each triac couples a different fraction of source power to the stator at light to moderate loads, and one triac is open-circuited at very light and zero loads causing the motor to operate in a partial sine wave single phase mode.

The load detecting means and wave modifiers may be as described in the aforementioned Parker et al U.S. Application Nos. 839,945 and 917,698.

DESCRIPTION OF THE PREFERRED EMBODIMENTS

Figure 1:
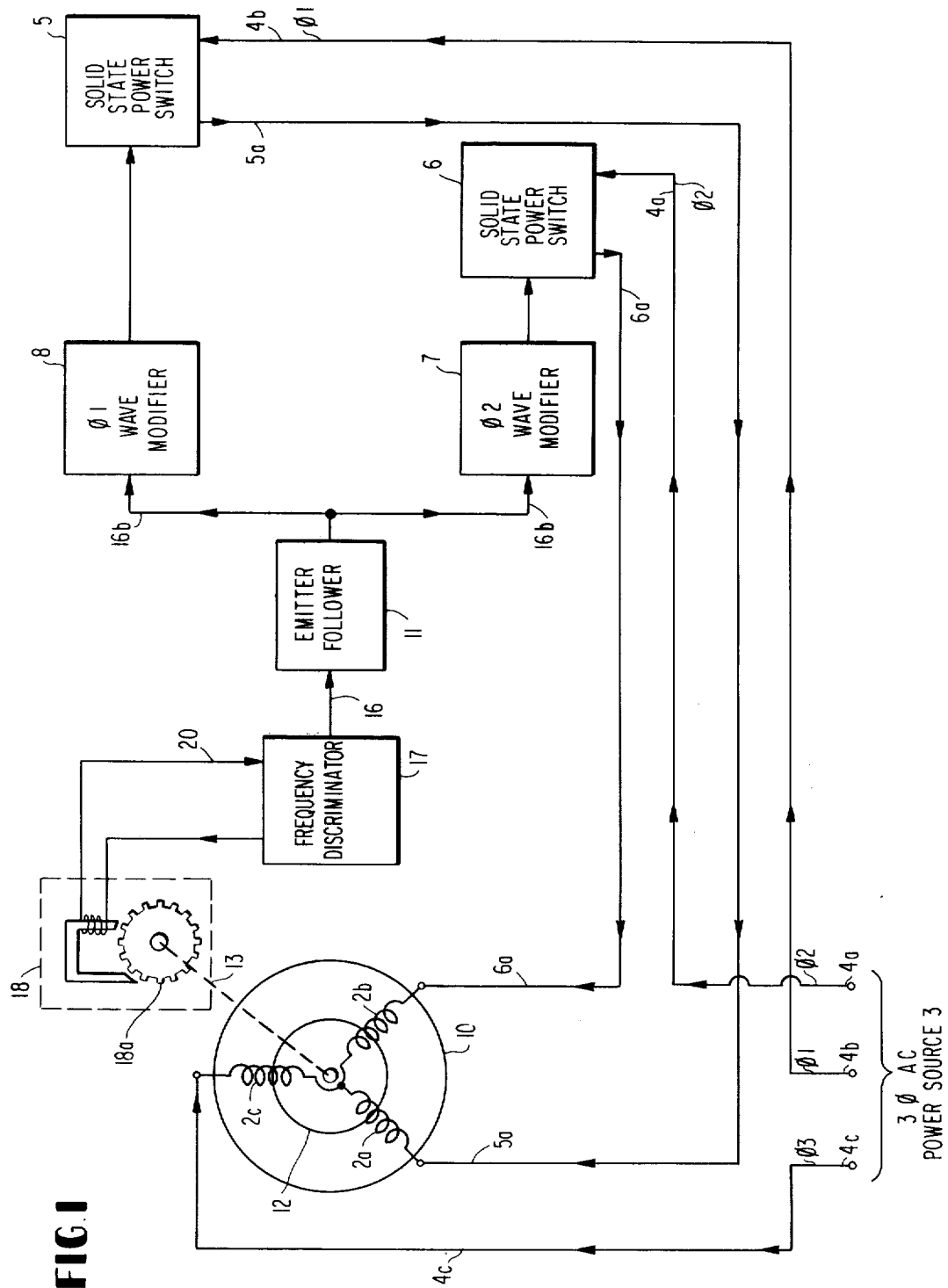
FIG. 1 is a block diagram of an energy economizer system constructed in accordance with the present invention.

As shown in FIG. 1, a standard 3$\phi$ motor 10 is provided with stator windings 2a, 2b and 2c, e.g., which can be connected to a 3$\phi$ AC power source 3, as shown by lines 4a, 4b and 4c, to energize the stator windings thereby to effect rotation of rotor 12. In accordance with the present invention, power source 3, instead of being coupled directly to each of the motor stator windings, are connected as shown in FIG. 1. One conductor, designated for descriptive purposes as 4c, is connected directly to stator winding 2c in the normal fashion. Conductors 4b and 4a, however, are connected respectively to one side of two solid state switches 5 and 6, the other sides of which are connected as at 5a and 6a to the inputs of windings 2a and 2b of the motor stator. Therefore, the average energy coupled to all windings from power source 3, including stator winding 2c, becomes a function of the conduction duration of switches 5 and 6. Switches 5 and 6, which may comprise, for example, Triac assemblies, form a part of wave modifiers 7 and 8 whose operation is controlled by a DC control voltage appearing on line 16b at the output of emitter-follower 11. Said DC control voltage magnitude corresponds to frequency modulation developed by a comparatively small AC generator mechanically coupled to motor 10.

The generator 18 of FIG. 1 comprises a toothed wheel 18a which is mounted at 13 on the shaft of induction motor 10. Toothed wheel 18a and its associated stator comprise a small AC generator whose output frequency modulation is determined by the nature of its rotational speed and the number of teeth on wheel 18a. The mean output frequency of the generator is an integral multiple of the mean speed of rotation of induction motor 10 and may, for example, be approximately 60 times the RPS of the motor. Generator 18's output, which by choice is of a much higher frequency than that of power source 3, is an electromechanically produced AC signal with two forms of load-related frequency modulation. A first form of rotor produced frequency modulation in generator 18 is inherent to all induction motors and is caused by the change in rotor slip that results from a change in motor mechanical load. More particularly, the mean (or average) frequency of the AC signal (generated by motor shaft rpm) changes in direct proportion to load related rpm changes. Both polyphase and single phase motors produce this form of load-induced frequency-shift modulation.

Less obvious rotor movements of a three phase motor operated in a single phase or three phase partial sine wave mode produce another form of frequency modulation in the output of generator 18. There are natural torque variations in single phase motor operation due to the sinusoidal current flowing through its stator windings passing through a zero value twice in each cycle causing minor speed variations. Thus, with a 60 Hertz AC power source, single phase operation produces 120 load-responsive torque and speed variaions per second which said generator experiences. Likewise, operating a three phase motor on 60 Hertz partial sine waves produces 360 such torque and speed variations which frequency modulate said generator's output. Therefore, as motor 10's load increases (from zero load), the signal from generator 18 will consist of a mean frequency proportional to its average speed with variations above and below this mean frequency occurring first at a rate of 120 times per second during single phase operation, changing to to 360 times per second as partial sine wave, three phase operation begins.

This FM/FM modulated AC signal is applied to the input of frequency discriminator 17 which converts said frequency modulation appearing on line 20 to a corresponding DC control voltage or signal on line 16 whose magnitude is a function of the total frequency modulation of said signal at motor speeds above about 95% of synchronous speed.

For purposes of the subsequent description, it will be assumed that generator 18 has 60 teeth and the induction motor rotates at a speed of 30 RPS so that the AC output from the small generator connected thereto includes 1800 Hz., and these parameters will be referred to hereinafter for purposes of illustration.

Figure 2:
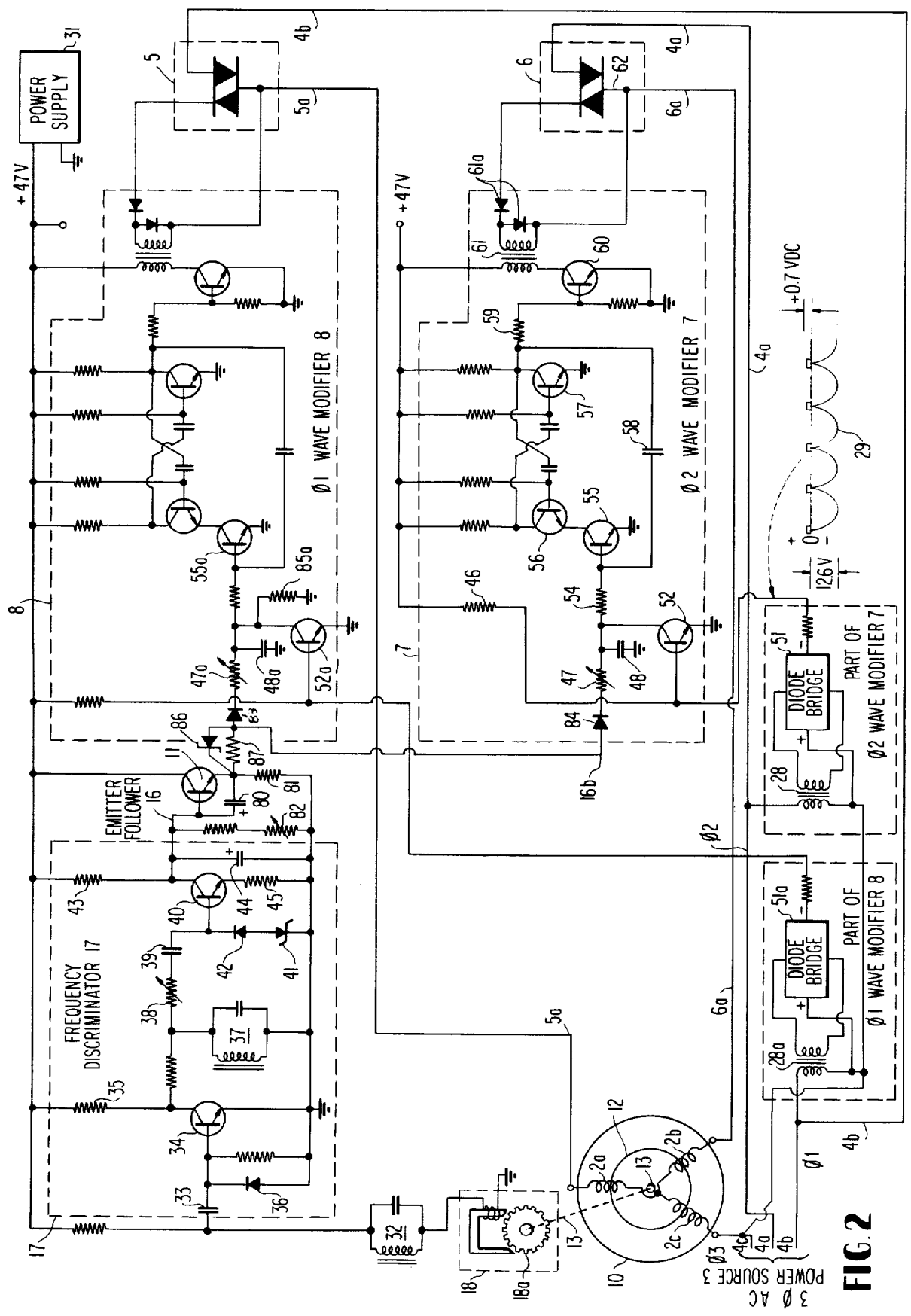
FIG. 2 is a schematic diagram of a preferred circuit of the type shown in block diagram form in FIG. 1.

The output signal from AC generator 18 is applied across an LC circuit 32 as shown on FIG. 2 which is broadly resonant at the generator frequency to obtain a more nearly sinusoidal waveform output. The resultant AC signal is applied via capacitor 33 to the base of transistor 34 whose collector is energized via resistor 35 from the positive side of DC supply 31. Any amplitude variations of the signal from the AC generator 18 are eliminated by the clamping actions of a diode 36 and the limiter action of the base-emitter junction of transistor 34. Consequently, transistor 34 acts as a limiter amplifier.

Due to the positive and negative clamping actions, the waveform at the base and collector of transistor 34 becomes a flat top wave. These flat top pulses are fed to and excite a high Q resonant circuit 37 which is tuned above one of the frequencies of generator 18 to approximately 1850 Hz. The output signal of the AC generator operates on the slope of the resonance curve of circuit 37, so that said circuit 37 acts, in effect, as a frequency discriminator, i.e., the voltage appearing across circuit 37 varies in amplitude in accordance with the frequency modulation of the signal which is supplied thereto from transistor 34.

The signal developed across resonant circuit 37 is fed through a variable resistor 38 and a capacitor 39 to a signal-biased DC amplifier comprising transistor 40. As the signal derived positive base voltage rises above its cut-off threshold, there is a rapid, non-linear turn-on of transistor 40 collector current. Variable resistor 38 is adjusted so that said non-linear turn-on is referenced to a particular energy-efficient speed above about 95% of the motor's synchronous speed. Above said speed, transistor 40's average conduction becomes gradually more linearly responsive to said demodulated signal voltage magnitude. Transistor 40 is signal-biased in both a forward and reverse bias direction by the charge and discharge of capacitor 39 caused by the passage of alternating current through said capacitor and its subsequent rectification by transistor 40. Due to said reverse bias and transistor 40's unbypassed emitter resistor 45, the load imposed on resonant circuit 37 by transistor 40 is minimal. Zener diode 41, connected between the anode of a diode 42 and ground, provides a low resistance discharge path for capacitor 39 during negative reverse bias signal alternation peaks that exceed its conduction threshold (Zener) voltage thereby protecting transistor 40 from high negative voltage peaks. Diode 42 prevents the positive forward bias signal alternation from being conducted to ground through Zener diode 41.

Since the amplitude of the AC voltage across resonant circuit 37 varies in accordance with the load-related frequency modulation of the signal supplied thereto, the bias on transistor 40 also varies and the portion of the signal which is effective to render transistor 40 conductive similarly varies in accordance with the motor load at any given moment. Above the nonlinear conduction threshold of transistor 40, an increase in the amplitude of the AC voltage across resonant circuit 37 results in an increase in the current flow through resistor 43, which in turn, produces a greater voltage drop across resistor 43 and reduces the voltage at the collector of transistor 40, and vice versa. As a result, this particular portion of the circuit operates as an inverse signal generator, i.e., a reverse of amplitude variation occurs between the base and collector of transistor 40.

The collector of transistor 40 is connected to one side of a capacitor 44, the other side of which is grounded. Capacitor 44 is charged through resistor 43 part of the time, i.e., when transistor 40 is nonconductive, and is discharged through transistor 40 and resistor 45 when transistor 40 is rendered conductive. The time constant of the RC circuit 43, 44, is long compared to 1800 Hz., (i.e., the nominal output frequency of AC generator 18) and the mean frequency ripple voltage across capacitor 44 accordingly has a very low amplitude. As a result, when motor 10 is running near its most energy-efficient speed, the voltage across capacitor 44 decreases to a fairly steady DC potential whose average magnitude varies in proportion to the load and speed induced frequency modulation. Said voltage across capacitor 44 comprises the DC control voltage appearing on line 16 (shown in FIGS. 1 and 2). In FIG. 1, the DC control voltage line 16 is shown connected to the input of emitter-follower 11. FIG. 2 shows that emitter-follower 11 consists of a transistor 11, an AC bypass capacitor 80, a variable resistor 82, an output load resistor 81, and diodes 83 and 84. Emitter-follower 11 operates in a conventional manner and serves to isolate the DC control voltage developed at the collector of transistor 40 from loading by the DC control voltage inputs of wave modifiers 7 and 8 to which it is ultimately coupled.

Adjustment óf variable resistor 82 determines the maximum level to which capacitor 44 may charge during moments when transistor 40 is cut-off and, therefore, controls the rate at which the average DC control voltage may change with load-induced frequency modulation. In other words, resistor 82 may be employed to vary the system response (time) to a change in motor load.

Diodes 83 and 84 couple the DC control voltage appearing on line 16b to wave modifiers 7 and 8. Zener diode 86 conducts around resistor 87 at high DC control voltage magnitudes, thereby providing faster wave modifier response when (if) a heavy load is abruptly applied to motor 10.

Each of wave modifiers 7, 8 requires two control signal input. One of said inputs is coupled from a common source, i.e., the DC control voltage output of emitter-follower 11. The other input is an AC reference signal which synchronizes the conduction of a zero crossing detector (transistor 52 or 52a) with the voltage zero crossing of the particular phase (from AC power source 3) controlled by said wave modifier. In the case of modifier 7, for example, said second input control (or synchronizing signal is coupled from phase 2.

The operation of only wave modifier 7 and its zero crossing detector will be described since said operation in each wave modifier is the same. The synchronizing reference signal (described above) is coupled by transformer 28 whose primary is connected between phase 2 and phase 3. The secondary output of transformer 28, a low potential (e.g., 12.6 VAC) 60 cycle voltage, is connected to full wave rectifier 51 whose output is a series of negative going alternations with respect to ground (as at 29 on FIG. 2) which is coupled to the base of transistor 52. The base of transistor 52 is also supplied with forward bias current through resistor 46 from DC power supply 31. The negative going alternations from rectifier 51 keep transistor 52 nonconductive except at voltage zero crossing. Forward bias through resistor 46 causes collector-emitter saturation of transistor 52 near said zero crossings and, during this time, the junction of resistors 47 and capcitor 48 (i.e., the collector of transistor 52) is clamped to the near ground potential of 0.1 vdc. More particularly, after the phase 2 reference voltage pases through zero, the voltage supplied by rectifier 51 begins falling toward a negative (peak) value of −12.6 vdc. When the resultant voltage on the base of transistor 52 falls below approximately +0.7 vdc, collector-emitter cut-off occurs. Transistor 52 remains cut-off until the voltage at its base rises to +0.7 vdc due to the forward bias supplied by resistor 46 as phase 2 closely approaches its voltage zero crossing.

Thus, transistor 52 is cut-off most of the time during each said AC power source cycle, and conducts only slightly before, during and slightly after voltage zero crossings of the phase to which it is referenced. The duration of conduction of transistor 52 (and transistor 52a) is approximately 1 ms.

When transistor 52 is conductive, capacitor 48 discharges; when transistor 52 is cut off, as described above, capacitor 48 begins charging through resistor 47 toward the level of the DC control voltage which is supplied by capacitor 44. The resultant signal is supplied via resistor 54 to the base of a transistor 55 to render transistor 55 conductive, but the conduction of transistor 55 is delayed in accordance with the voltage which is actually present on the positive side of capacitor 48. More particularly, transistor 55 remains nonconductive until the voltage across capacitor 48, which is coupled to the base of transistor 55 through resistor 54, reaches approcimately +0.7 vdc., whereafter transistor 55 (which constitutes a trigger delay switch) begins to conduct collector-emitter current.

Transistor 55 is connected to the emitter of a transistor 56, which cooperates with a further transistor 57 and with a plurality of associated capacitors and resistors, to provide a multiple gate trigger generator which comprises an astable (free-running) multivibrator of well-known configuration, with one exception. The exception is that, whereas the emitter of transistor 57 is directly grounded, the emitter of transistor 56 in said multiple gate trigger generator is not grounded and, instead, is connected to ground through transistor 55. As a result, typical multivibrator operation of transistors 56, 57 is prevented until transistor 55 conducts to provide a conduction path to ground for the emitter of transistor 56. As soon as transistor 55 is brought to saturated conduction, typical astable multivibrator operation occurs. The starting of the multiple gate trigger generator 56, 57 is accelerated by capacitor 58 which feeds the starting pulse from the output of said generator to transistor switch 55.

The component values of the multivibrator (or multiple gate trigger generator) 56, 57 are selected to cause multivibrator action at approximately 20 kHz. The output signal which is produced, when the multiple gate trigger generator is rendered operative, takes the form of a train of trigger pulses each of which has a width in the order of 25 μs, occurring over a maximum time period of approximately 7 ms. per alternation of the AC power source 13, or occurring during such lesser portion of said AC power source cycle as may be determined by the time at which transistor 55 was rendered conductive to enable operation of the multiple gate trigger generator.

After transistor 55 is brought to saturation by the combined action of the forward bias coupled from capacitor 48 and the positive going or forward bias coupled to the base of transistor 55 via capacitor 58 from the output side of the multiple gate trigger generator, transistor 55 is maintained in this state by said combined forward biases for the remainder of the power source voltage alternations. The positive voltage pulses appearing at the output side of the multiple gate trigger generator are coupled via a resistor 59 to a gate trigger amplifier comprising a transistor 60, an associated transformer 61, and failure mode protection diodes 61a, for conversion to higher power current pulses which, in turn, are supplied to the gate electrode or control terminal 62 of a Triac assembly 6 connected between phase 2 of AC power source 3 and the stator winding 2b of induction motor 10. The protection diodes 61a prevent positive gate current flow and limit reverse gate voltage to approximately 2 v by diode clamping.

Triac assembly 6 is turned on by the arrival of the first pulse in the train of pulses coupled to its gate electrode from the gate trigger amplifier 60. The continuous stream of pulses thereafter supplied to the gate electrode 62 of Triac assembly 6 assures full balance conduction of Triac assembly 6 regardless of voltage transients which may be produced by the varying inductive load of the motor 10 that, otherwise, might create alternation imbalance by self-commutation at times other than the current zero crossings conducted from the AC power source 3.

The structure of wave modifier 8 is the same as that described above with respect to wave modifier 7, except for the addition of a resistor 85a which is connected across the time constant charging capacitor 48a to ground, and produces a difference in time constants and charging rate as compared to that of wave modifier 7. Variable resistors 47 and 47a may be adjusted at the time of manufacturing to avoid the necessity for precision components, or component selection, to obtain individually preferred delay vs control voltage input characteristics for wave modifiers 7 and 8 beyond that produced by fixed resistor 85a. Resistors 47 and 47a may also be employed to cause wave modifiers 7 and 8 to accommodate differing torque characteristics peculiar to three phase motors of different manufacture or construction.

The operation of the overall circuit shown in FIG. 2 will now be discussed. Assume no load is coupled to shaft 13 or rotor 12. When stator windings 2b and 2a of the three phase motor 10 are connected to solid state switches 6 and 5 (as shown in FIG. 2), and power from AC source 3 is applied directly to terminal 2c of motor 10 and to said solid state switches, there will at first be no output signal from generator 18 because motor 10 has not yet started to rotate. This results in a maximum DC control voltage on line 16b. This high DC voltage causes both wave modifiers 7 and 8 to couple a train of gate trigger pulses to their respective solid state switches without delay after each phase's voltage zero crossing, which in turn causes said solid state switches to start conducting without delay. Since this action is continuous, said switches will pass current in both directions, stator windings 2b and 2a will receive full waves of 60 Hertz voltage, as does winding 2c, causing the rotor 12 to commence rotation with full torque.

As motor 10 approaches full rotational speed, frequency modulated AC generator 18 acting through frequency discriminator 17 will begin to reduce the magnitude of the relatively high DC control voltage on line 16 and, therefore, on line 16b. Ultimately the decreasing DC control voltage on line 16b will become of insufficient magnitude to fully charge capacitors 48a and 48, through their respective charging resistors 47a and 47, before they are discharged by transistors 52a and 52, which act as reference phase voltage zero crossing reset switches. Under this condition, the voltages across capacitors 48a and 48 are not sufficiently high immediately after zero crossing to reach the conduction threshold of transistors 55a and 55, and to start operation of their multiple gate trigger generators. The result is that solid state switches 5 and 6 will not immediately begin conduction at the start of the sine wave cycles from power source 3 as they did before. Fractional waveforms are actually delivered to windings 2b and 2a of the motor stator by solid state switches 6 and 5 and the resultant waveform at winding 2c accordingly soon represents only a part of the sine wave power available from power source 3.

As previously mentioned, the charging time constants of the input circuits to transistors 55a and 55, of wave modifiers 8 and 7 respectively, are different due to the addition of resistor 85a in wave modifier 8. More particularly, the time required to turn on transistor 55a is longer, and the rate of charge per unit of DC voltage input is less of capacitor 48a than for transistor 55 and capacitor 48 respectively. Therefore, as the DC control voltage decreases in accordance with the full power to full speed start-up of motor 10 just described, a delay in the turn on conduction after zero crossing reset appears first with solid state switch 5 (designated $\phi 2$ for descriptive purposes). Under the no load condition (previously assumed here for descriptive purposes), the DC control voltage continues to decrease after the motor has reached full rotational speed and soon solid state switch 6 likewise does not commence conducting to $\phi 2$ immediately after its phase zero crossing.

As the DC control voltage continues to decrease, the portion of sine-wave power coupled by action of wave modifier 8 acting upon solid state switch 5 continues to decrease. Ultimately, the control voltage charging capacitor 48a corresponds to the (assumed) zero load condition and does not reach the conduction threshold of transistor 55a at $\phi 1$ zero crossing and, therefore, solid state switch 5 does not turn on during any portion of the sine-wave period from power source 3. That is, winding 2a of the motor stator is open-circuited, and motor 10, a three phase motor, begins operating in what the art refers to as a single phase mode. It is well known in the art that, once running, a lightly loaded three phase motor will continue to run near synchronous speed when only two of its three stator windings are connected to a three phase AC power source. Thus, when there is no load on the motor, the control system, after full power start-up, becomes controllingly operative and maintains a particular motor speed by establishing a condition wherein winding 2a is open-circuited and winding 2b receives electrical energy for approximately 6 ms out of the 16.6 ms (available) during each cycle of sine-wave power from a 60 Hertz AC power source. Said particular motor speed is established as an energy-efficient operating reference by adjusting variable resistor 38 of FIG. 2 (in frequency discriminator 17) to the incidental motor speed which provides maximum motor efficiency at zero load. This otherwise incidental shaft speed is thus made particular by generic properties of induction motors and is further particularized to properties peculiar to said controlled motor by adjustment of resistor 38, and possibly by adjustment of resistors 47 and 47a as well.

It has been demonstrated with a model constructed in accordance with the teaching of this invention that after full power start-up, three phase motor 10 will operate effectively when only a portion of AC source 3 sine-wave power is coupled by wave modifier 7 to stator winding 2b and winding 2c is connected directly to the power source at 4a while winding 2a is open-circuited by solid state switch 5. Furthermore, motor 10 consumes substantially less energy when running in said partial sine-wave, single phase mode, with no or very light loads, as compared to its operation with two or all three stator windings connected directly to power souce 3, or even when all three stator windings are receiving partial sine-wave power.

Assume now that the load on shaft 13 of rotor 12 begins rising above zero, referring still to FIG. 2.

As the motor load increases, the slip of motor 10 increases and its speed drops; this reduces the mean frequency and produces load-induced frequency modulation of generator 18 which, in turn results in proportional increase in the DC control voltage output of frequency discriminator 17, on line 16b, which charges capacitors 48 and 48a. The increasing DC control voltage enables transistor 55a to conduct before transistor 52a discharges capacitor 48a at $\phi 1$ voltage zero crossing, and enables solid state switch 6 to start conducting nearer the beginning of the power source 4a voltage cycle. Solid state switch 5, previously open-circuited, starts conduction just before the voltage zero crossing of the power source to 4b. At this moment, three phase motor 10, which had been operating in a single phase mode, begins to operate again as a three phase motor. With switch 6 coupling more of the AC power source 3's sine-wave to motor stator winding 2b, and switch 5 beginning to couple AC power source 3's sine-wave to motor stator winding 2a, unbalanced three phase power is now being applied to motor 10.

When the load increases further, switches 6 and 5 continue to increase their conduction duration, with switch 5 increasing conduction time at a different rate because of the different time constants of wave modifiers 8 and 7. Three phase power unbalance is as insignificant at light loads as is single phase mode operation at very light loads and, due to said different wave modifier time constants, sufficient balance is quickly achieved above light motor loads. Near full rated load and thereafter, switches 6 and 5 are again both conducting continuously and full three phase power is coupled to the motor stator windings.

When power is first applied, and motor 10 is coupled to a mechanical load equal to or greater than its rated load, the DC control voltage on line 16b, being responsive to the load-induced frequency modulation of generator 18, will not decrease to the wave modifier controlling level and full sine-waves of three phase power will continue to be supplied after full power start-up. If the motor load decreases, however, the slip of the motor decreases, and its speed begins to increase; this decreases said load-induced frequency modulation and increases the output mean frequency of AC generator 18 which, as a result of the operations described above, decreases the operative angle of the AC waves from power source 3 applied to stator windings 2b and 2a and, therefore, the three phase sine-wave power which is supplied to the motor. Ultimately, if the load continues to decrease, solid state switch 5 will not be triggered on for reasons stated above, although switch 6 will continue to be triggered, and motor 10 will again assume a single phase mode of operation.

Thus, regardless of the load condition at motor start or any subsequent moment, the present invention substantially maintains the particular speed at which three phase motor 10 most efficiently converts electrical energy to mechanical energy.

I claim:

1. An energy economizing AC power control system operative to reduce the iron and copper losses in a conventional three phase AC induction motor by varying the form and magnitude of input voltage coupled thereto, comprising a conventional three phase AC induction motor having three stator windings and a rotor adapted to be coupled to a load, a three conductor three phase sine wave power source for energizing said stator windings to effect rotation of said rotor, and a conditionally closed loop positive feedback control means that becomes operative to control the energization of said stator windings from said power source by reference to a particular speed caused to be energy-efficient by properties inherent to induction motors during a limited range of motor speeds near the full speed of said motor, said closed loop positive feedback control means comprising: motor load detecting means coupled to said rotor and operative to produce a frequency modulated signal related to the load on said motor, frequency discriminator means coupled to said load detecting means for producing a DC control voltage which varies in magnitude in inverse relation to the speed of said motor, emitter-follower means coupled to the output of said frequency discriminator means to render said frequency discriminator means insensitive to variations of subsequent circuit means while coupling said DC control voltage to said subsequent circuit means, a plurality of voltage coupling means coupled to the output of said emitter-follower means for providing a plurality of DC control voltage outputs which are isolated from each other, two wave modifier means responsive respectively to said DC control voltage outputs and including associated switching means disposed between two conductors of said three phase power source and two of said three stator windings, the third stator winding being directly connected to the third conductor of said power source, said wave modifier means being operative to apply full sine waves of voltage from said power source to their associated stator windings during rotational start-up and speed build-up of said motor and, as said motor reaches said particular speed, then being operative to substantially maintain said particular speed by varying the electrical angle of each cycle of said power source which is actually coupled to said two stator windings, and therefore to said third stator winding, thereby providing varying fractions of each sine wave of voltage from said power source to all three of said stator windings in accordance with the energy requirements imposed on said motor by the rotor load at any given moment and in accordance with the inherent electromechanical properties of said motor, whereby said closed loop positive feedback control means functions to substantially reduce the iron and copper losses of said conventional motor by causing the average current supplied from said power source to said stator windings to be supplied primarily as a function of the load on and properties inherent to said motor as the load of said motor varies between zero and maximum rated load.

2. The control system of claim 1 wherein said switching means includes two Triac assemblies, each having its input coupled to a separate one of the three conductors of said sine wave power source and its output connected to a separate one of the three inputs to said stator winding, and an associated control circuit coupled to the control terminal of each Triac assembly, each of said control circuits being responsive to the magnitude of said DC control voltage for controlling the conductivity of each said Triac during each cycle of its respective phase of said three phase sine wave power source.

3. The control system of claim 1 including means for altering the rate of change in power coupled from said AC power source by each of said wave modifiers at no or light loads as compared to each other in response to a given change in said DC control voltage coupled from said load detecting means through said isolated coupling means to said wave modifiers.

4. The control system of claim 3 including nonlinear coupling means interposed between said frequency discriminator and said wave modifiers, said nonlinear means being a resistor paralleled by a zener diode, said diode being operative to couple steeply rising DC control voltage produced by a step-function motor load around said resistor to said wave modifiers.

5. An energy economizing AC power control system operative to reduce the iron and copper losses in a conventional polyphase induction motor having a plurality of different phase stator windings and a rotor adapted to be coupled to a load, a polyphase sine wave power source for energizing said stator windings to effect rotation of said rotor, and a nonlinear closed loop positive feedback control means conditionally operative to control the form and magnitude of the energization of said stator windings from said power source above a particular reference speed dependent upon the inherent electromechanical properties of induction motors which cause such motors to exhibit speed related efficiency, said feedback control means comprising: motor load detecting means coupled to said rotor and operative to produce a frequency modulated signal related to both the load on and speed of said motor, a nonlinear circuit coupled to said load detecting means for producing a control signal which varies as a function of the speed and load of said motor above said particular reference speed, at least two wave modifier means coupled to the output of said nonlinear circuit and responsive to said control signal, said two wave modifier means each including switching means and being disposed respectively between different phases of said polyphase sine wave power source and different ones of said stator windings, the conduction time of the switching means in each of said wave modifier means being controllable during each cycle from the associated phase of said power source as a function of said control signal, said two wave modifier means being operative respectively to apply full sine waves of voltage from said power source to their associated stator windings during rotational start-up and speed build-up of said polyphase induction motor and, as said motor reaches said particular speed, then being operative to vary the electrical angle of each cycle of said power source which is actually coupled to said stator winding to provide varying fractions of each sine wave of voltage from said power source to said stator winding in accordance with the energy requirements imposed on said motor by the inherent electromechanical properties of said motor and the rotor load at any given moment, whereby said closed loop positive feedback control means functions to substantially reduce the iron and copper losses of said polyphase induction motor by causing the average current supplied from said power source to said stator windings to be supplied primarily as a function of the load and properties inherent to said motor as the load on said motor varies between zero and maximum rated load.

6. The control system of claim 5 wherein the switching means in each of said wave modifier means includes a Triac assembly having its input coupled to an associated phase of said sine wave power source and its output connected to said associated stator winding, and a control circuit coupled to the control terminal of said Triac assembly and responsive to said control signal for controlling the conductivity of said Triac assembly during each cycle of said associated phase of said sine wave power source.

7. The control system of claim 6 wherein said control circuit comprises trigger pulse generators operative selectively to produce trains of trigger pulses, means responsive to said control signal for controlling the operation of said trigger pulse generators, and amplifier means coupling trigger pulses from the output of said trigger pulse generators to said control terminals of said Triac assemblies.

8. The control system of claim 7 including rectifier means responsive to the voltage zero crossings of two phases of said sine wave power source for controlling the starting and stopping of said trains of trigger pulses.

9. The control system of claim 8 wherein each of said rectifier means is connected respectively to the base of a transistor and operates to keep said transistor cut off except during said zero crossings of the associated phases of said sine wave power source, said transistors being connected respectively to a further transistor which is connected to said trigger pulse generators, said further transistors being operative as switches to turn said trigger pulse generators on and off.

10. The control system of claim 9 including capacitor means coupling the output of said trigger pulse generators to said further transistors and operative to feed the starting pulses from said output to said further transistors to accelerate the turning on and pulse switching of said trigger pulse generators.

11. The control system of claim 7 wherein each of said trigger pulse generators comprises a normally inoperative multivibrator, and means repponsive to said control signal for controlling the time at which said multivibrator is rendered operative in respect to the beginning of each voltage cycle of the associated phase of said sine wave power source thereby to control the time at which said Triac assembly is rendered conductive in relation to the beginning of each said cycle.

12. The control system of claim 5 wherein said load detecting means comprises a comparatively small AC generator coupled to said rotor for rotation with said rotor, said generator being operative to electromechanically produce a frequency modulated AC signal having a plurality of frequencies which vary with variations in the speed of and load on said motor, an amplitude limiter, a signal-biased nonlinear DC amplifier, and frequency discriminator means coupled through said amplitude limiter to said AC generator and to said DC amplifier for converting said frequency variations to amplitude variations of said control signal.

13. The control system of claim 12 wherein said frequency discriminator means is connected between the output of said AC generator and the input of said DC amplifier, said DC amplifier including means for varying the signal derived forward bias amplitude of said DC amplifer as a function of the instantaneous frequencies of said AC signal.

14. The control system of claim 5 wherein said load detecting means comprises a reference signal derived from the rotor action of said rotor, said rotor action being operative to modulate a characteristic of said signal derived therefrom in accordance with variations in the load on and the speed of said rotor, and demodulating means operative to convert said generated signal modulation to command variations of said control signal.

15. The control system of claim 14 including commandable control circuit means adjustably responsive to said control signal command variations above said particular efficiency-related reference speed.

16. The control system of claim 5 wherein at least one of said stator windings is connected directly to one of the phases of said power source.

17. The control system of claim 5 wherein said polyphase induction motor is a three phase motor having three stator windings, two of said stator windings being connected to two phases of said power source via the switching means in said two wave modifier means respectively, and the third stator winding being connected directly to the third phase of said power source.

18. The control system of claim 17 wherein one of said two wave modifiers includes means operative to produce a phase angle delay in the turn on of its associated Triac at zero and very light motor loads in response to said control signal from said load detecting means to each of said wave modifiers.

19. The control system of claim 5 wherein said wave modifiers are operative to couple continuous sine waves of power to their respective stator windings when the average speed of said rotor is below said particular speed reference.

20. The control system of claim 19 wherein said three phase motor is operated in a partial sine wave single phase mode by said wave modifier means in response to said control signal to maintain the particular rotor speed at which said motor achieves its most energy-efficient conversion of electrical energy to mechanical energy at zero and very light mechanical loads.

* * * * *